US006816258B2

(12) United States Patent
Hutchin

(10) Patent No.: US 6,816,258 B2
(45) Date of Patent: Nov. 9, 2004

(54) DISPERSIVE SPECTROMETER

(75) Inventor: Richard A. Hutchin, Malibu, CA (US)

(73) Assignee: Optical Physics Company, Calabasas, CA (US)

( * ) Notice: Subject to any disclaimer, the term of this patent is extended or adjusted under 35 U.S.C. 154(b) by 341 days.

(21) Appl. No.: 10/060,061

(22) Filed: Jan. 28, 2002

(65) Prior Publication Data

US 2003/0142307 A1 Jul. 31, 2003

(51) Int. Cl.[7] .............................. G01J 3/28; G01J 3/14
(52) U.S. Cl. ..................................... 356/328; 356/326
(58) Field of Search ................................. 356/326, 328; 359/837

(56) References Cited

U.S. PATENT DOCUMENTS

| 5,993,634 A | * 11/1999 | Simpson et al. ............ 204/612 |
| 6,149,465 A | 11/2000 | Berg et al. .................. 439/630 |
| 6,469,846 B2 | * 10/2002 | Ebizuka et al. ............. 359/837 |
| 6,549,280 B2 | * 4/2003 | Riccardo et al. ............ 356/326 |

OTHER PUBLICATIONS

*Remote Sensing By Fourier Transform Septrometry*, Reinhard Beer, vol. 120 in Chemical Analysis : A Series of Monographs on Analytical Chemistry and its Applications, Chapter 2, The Ideal Fourier Transform Spectrometer, pp. 15–29; Chapter 4, Real Fourier Transform Spectrometers, pp. 55–100; and Chapter 5, Case Studies of Remote Sensing Fourier Transform Spectrometers, pp. 101–127.
Atmospheric corrections: On deriving surface reflectance from hyperspecral imagers, A F H Goetz, J W Boardman, B Kindel, and K B Heidebrecht, *Proceedings of SPIE* (1997) 3118: 14–22.

Performance trade–offs of infrared spectral imagers, J N Cederquist, and C R Schwartz, *Proceedings of SPIE* (1997) 3118: 23–27.
Thermal Imagery Spectal Analysis, B H Collins, R C Olsen, and J Hackwell, *Proceedings of SPIE* (1997) 3118: 94–105.
Updated results from performance characterization and calibration of the TRWIS III hyperspectral imager, M A Folkman, S Sandor, S Thordarson, T Hedman, D Gleichauf, S Casement, B Quon, and P Jarecke, *Proceedings of SPIE* (1997) 3118: 142–153.
High–speed imaging spectrometry, C E Volin, M R Descour, and E L Dereniak, *Proceedings of SPIE* (1997) 3118: 179–183.
New Approach To Imaging Spectroscopy Using Diffractive Optics, M Hinnrichs, M Massie, *Proceedings of SPIE* (1997) 3118: 194–205.
Quantitative assessment of hyperspcectral sensor detection performance, A Sommese, B Shetler, and F P Billingsley, *Proceedings of SPIE* (1997) 3118: 308–321.
Imaging spectrometers using concentric optics, D R Lobb, *Proceedings of SPIE* (1997), 3118: 339–347.

(List continued on next page.)

Primary Examiner—Zandra V. Smith
(74) Attorney, Agent, or Firm—Fulbright & Jaworski L.L.P.

(57) ABSTRACT

A dispersive spectrometer comprising a primary lens that images a scene onto a slit through which light from a thin portion of the scene passes to a collimating lens. A grism is optically coupled to the collimating lens. The grism includes a diffractive element and is disposed such that light from the thin portion of the scene has an angle of incidence upon the diffractive element that is greater than one-third of the critical angle at the surface of the grism. The diffractive element disperses light from the thin portion of the scene in a direction that is perpendicular to the major dimension of the thin portion of the scene. A focusing lens is optically coupled to the grism to receive dispersed light from the thin portion of the scene. The focusing lens defines a focal plane onto which light from the thin slice of the scene is imaged.

14 Claims, 6 Drawing Sheets

OTHER PUBLICATIONS 4.0 *Multispectral and Hyperspectral Sensing*, pp. 4–1 to 4–26.

W. K. Hogan et al., "A Novel Low–Cost Small–Form–Factor Transceiver Module", IBM Microelectronics MicroNews, vol. 6, No. 3, pp. 26–33, Third Quarter 2000 (http://www.chips.ibm.com/micronews/vol6_no3/MN_vo16_no3.pdf).

U.S. patent application Ser. No. 09/915,884, "Optical Subassembly (OSA) for Optoelectronic Modules, and Method of Making Same", Joseph P. Kuczynski, filed Jul. 26, 2001.

U.S. patent application Ser. No. 09/248,285, "UV Curable Adhesives Containing Ceramic Microsheres", Joseph P. Kuczynski, filed Feb. 11, 1999.

* cited by examiner

DISPERSIVE SPECTROMETER

BACKGROUND OF THE INVENTION

1. Field of the Invention

The field of the present invention is spectroscopy and in particular hyperspectral sensors.

2. Background

In a typical dispersive spectrometer, a scene is imaged onto a slit so that light from a thin portion of the scene passes through the slit. Light from the thin portion of the scene is then collimated, passed through a dispersive element such as a prism or grating, and imaged onto a focal plane. The resulting image on the focal plane is a spread spectrum image of the thin portion of the scene passed through the slit. Thus, the spectrum for each pixel of the image from the slit may be recorded by a focal plane array. Usually, the slit is scanned over the image of the scene to create what is commonly called a data cube in which the spectrum for each slit pixel in a two-dimensional scene is stored.

The data cubes created by the above process may be very large. For example, if a 256×256 focal plane array is used, for any given thin portion of an image, 256 spectral pixels are measured for each of the 256 slit pixels. If the slit is scanned across 256 separate thin portions of the scene, then the total data cube will consist of 256×256 slit pixels, and each slit pixel is associated with 256 spectral pixels. Altogether, this amounts to 16 million data points within the data cube. Assuming two bytes of information for each data point, such a data cube would contain approximately 32 Megabytes of data.

In order to image an entire industrial region using a dispersive spectrometer, very large data cubes are necessarily generated, with the data cubes containing many Gigabytes of data. The overall size of such large data cubes and the time required to process the data may be reduced by optimizing the spectral sampling.

The limiting size of currently available infrared focal plane arrays provides additional incentive to optimize the spectral sampling. For example, in the long-wavelength infrared (LWIR) band, current technology supports only about 256×256 pixel focal plane arrays suitable for high performance dispersive sensors where a 1024×1024 pixel focal plane array would be more desirable to increase spatial coverage and provide better spectral resolution. However, not only are the currently available focal planes restricted in size, but they are also very expensive, frequently costing millions of dollars to develop.

Dispersive spectrometers using gratings typically produce a spectral sampling that is approximately uniform in wavelength. Thus, each spectral pixel samples an equal range of wavelength, such as every 10 nanometers. Prism based dispersive spectrometers, however, sample non-uniformly in wavelength according to the variation in refractive index for the particular material used.

Both of these dispersive designs do not match the ideal sampling for gaseous materials, which is constant sampling in wavenumber (1/wavelength) over a fairly broad spectrum. Many gaseous materials tend to have spectral line widths which are constant in wavenumber. Thus, when monitoring materials with such characteristics, it is often desirable to have sampling intervals that are approximately constant in wavenumber. However, for some applications it may be desirable to stress one portion of the band over another or to have a specific variation in spectral resolution across the band being analyzed.

SUMMARY OF THE INVENTION

The present invention is directed to a dispersive spectrometer that utilizes a grism to disperse light from a thin portion of a scene. The dispersive spectrometer comprises in optical alignment a primary lens, a slit, a collimating lens, a grism, and a focusing lens. The primary lens images a scene onto the slit and light from a thin portion of the scene passes through the slit. Light from the thin portion of the scene is thereafter dispersed by the grism. The grism includes a diffractive element integral to a surface of the grism. The grism is disposed so that light passing through the dispersive spectrometer has an angle of incidence upon the surface including the diffractive element that is greater than one-third of the critical angle at the surface. Additionally, the grism is oriented so that the diffractive element disperses light from the thin portion of the scene in a direction that is perpendicular to the major dimension of the thin portion of the scene. The focusing lens defines a focal plane upon which the dispersed light is imaged.

In a first separate aspect of the present invention, the grism may be formed of a material having an index of refraction that varies over a range of wavenumbers. In this case, the index of refraction of the grism may disperse light either in the same direction as or in a direction opposite from the dispersion provided by the diffractive element.

In a second separate aspect of the present invention, the dispersive spectrometer further comprises a focal plane array disposed at the focal plane. The focal plane array detects the dispersed light from the thin portion of the scene. The focal plane array may be used to detect light in specific bands.

In a third separate aspect of the present invention, the dispersive spectrometer further comprises a prism optically disposed between the collimating lens and the grism. The prism disperses light from the thin portion of the scene in either the same direction as or in a direction opposite from the dispersion provided by the diffractive element. The combination of a prism and a grism may be used to additionally shape the spectral output of the dispersive spectrometer as desired.

In a fourth separate aspect of the present invention, the dispersive spectrometer further comprises a second grism optically disposed between the collimating lens and the first grism. The second grism disperses light from the thin portion of the scene in either the same direction as or in a direction opposite from the dispersion provided by the diffractive element. The combination of the two grisms may be used to additionally shape the spectral output of the dispersive spectrometer as desired.

In a fifth separate aspect of the present invention, any of the foregoing aspects may be employed in combination.

Accordingly, it is an object of the present invention to provide an improved dispersive spectrometer. Other objects and advantages will appear hereinafter.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
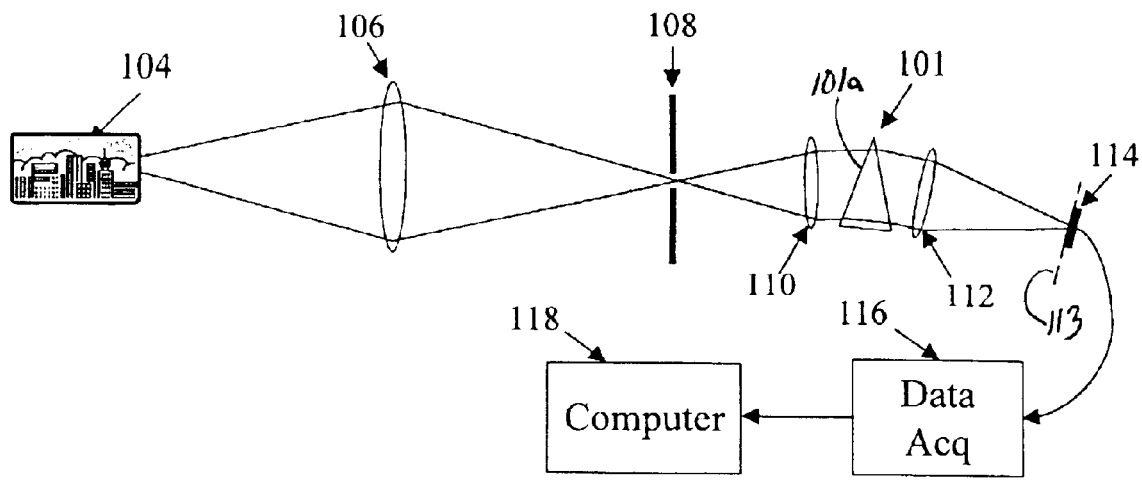
FIG. 1 is a schematic illustration of a dispersive spectrometer utilizing a prism according to the prior art.

Turning in detail to the drawings, FIG. 1 illustrates a dispersive spectrometer 100 using a prism 101 as it exists in the prior art. Radiant energy from the scene 104 is collected by a primary lens 106 and focused onto a slit 108. Light from a thin portion of the scene passes through the slit 108 and is collimated by a lens 110. A prism 101 disperses the collimated light into its constituent wavelengths according to the refractive properties of the prism 101. The resulting dispersed light is imaged by a focusing lens 112 onto a focal plane 113. A focal plane array 114 is disposed at the focal plane 113 to detect the dispersed light. The signal generated by the focal plane array 114 is read out, digitized, and stored as data in a data acquisition system 116. Thereafter, the data may be accessed by a computer 118 for processing and display.

The position of the light from such the dispersive spectrometer of FIG. 1 is a highly nonlinear function of wavenumber, and is determined by the following equation:

$$\text{Deflection}(v) = a\sin\left[n(v) \cdot \left(a\sin\left(\frac{\sin(\beta)}{n(v)}\right) - \alpha\right)\right],$$

where $v$ is the wavenumber of the light, $\alpha$ is the prism vertex angle, $\beta$ is the angle of incidence of the light with the entry surface of the prism, and $n(v)$ is the refractive index of the prism material as a function of wavenumber.

Figure 2:
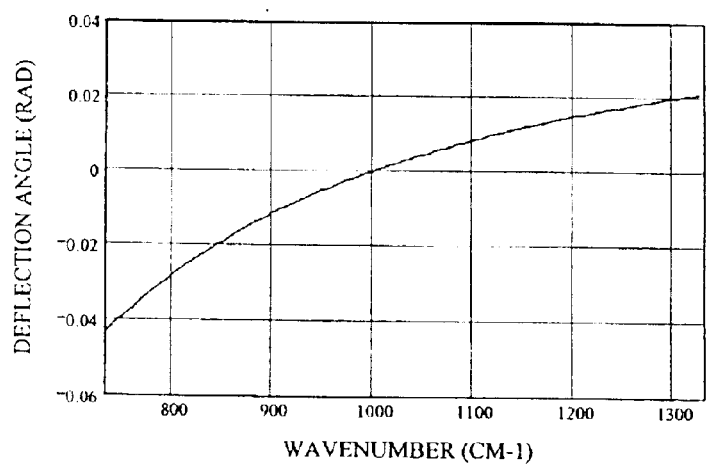
FIG. 2 is a plot representing the position of light on the focal plane versus spectral wavenumber for the dispersive spectrometer of FIG. 1.

FIG. 2 is a plot representing the position of light on the focal plane array 114 as a function of wavenumber. In FIG. 2, the deflection of the central color has been subtracted to provide a zero reference, as normally the optical system is aligned so that the central color has little or no dispersion. The plot of FIG. 2 was obtained using a prism made of sodium chloride (NaCl) and having a 60 degree wedge angle. The prism was positioned so that light from the thin portion of the scene had a 60 degree angle of incidence upon the entry face 101a of the prism 101. Such a prism is often used in the long-wavelength infrared (LWIR) band from 8–14 micrometers wavelength due to its relatively large dispersion and high transmission. However, as can be noted from the plot of FIG. 2, the position of light on the focal plane array 114 is not very linear in wavenumber.

Figure 3:
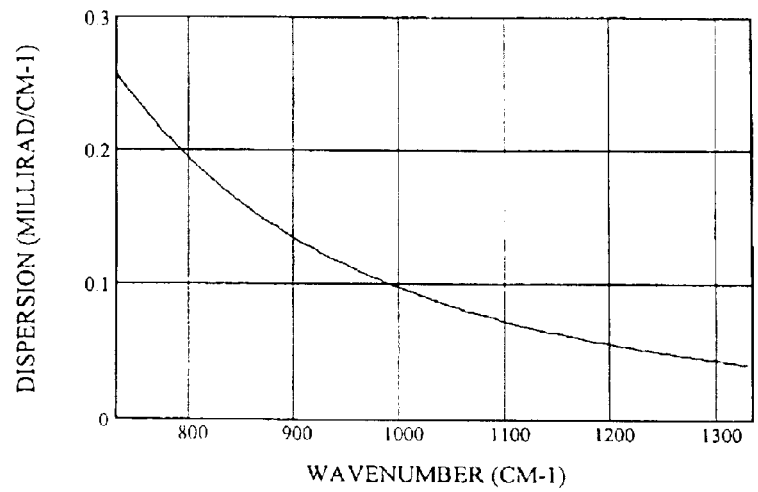
FIG. 3 is a plot representing dispersion versus wavenumber for the dispersive spectrometer of FIG. 1.

FIG. 3 is a plot representing the derivative of the plot of FIG. 2. This plot shows the spectral dispersion of light as a function of wavenumber for the dispersive spectrometer of FIG. 1. For gas detection in the LWIR band, the ideal spectral dispersion is a constant spectral dispersion, such that each data point on the focal plane represents the same spectral bin in wavenumbers. As can be seen from the plot of FIG. 3, the non-linearity in wavenumber for a dispersive spectrometer using an NaCl prism results in approximately 2.5× over-sampling in the region around 750 cm$^{-1}$ and approximately 2.5× under-sampling in the region around 1300 cm$^{-1}$. Unfortunately, over-sampling wastes expensive focal plane array pixels and under-sampling reduces the spectrometer's ability to identify and quantify different gases. Thus, a dispersive spectrometer using an NaCl prism is not well suited for broad spectral measurements in the LWIR band. Also, because no known prism material combines an index of refraction that is linear in wavenumber, generates sufficient dispersion, and sufficiently transmits a desired band, prism-based spectrometers cannot be used to obtain dispersion that is nearly constant in wavenumber.

Figure 4:
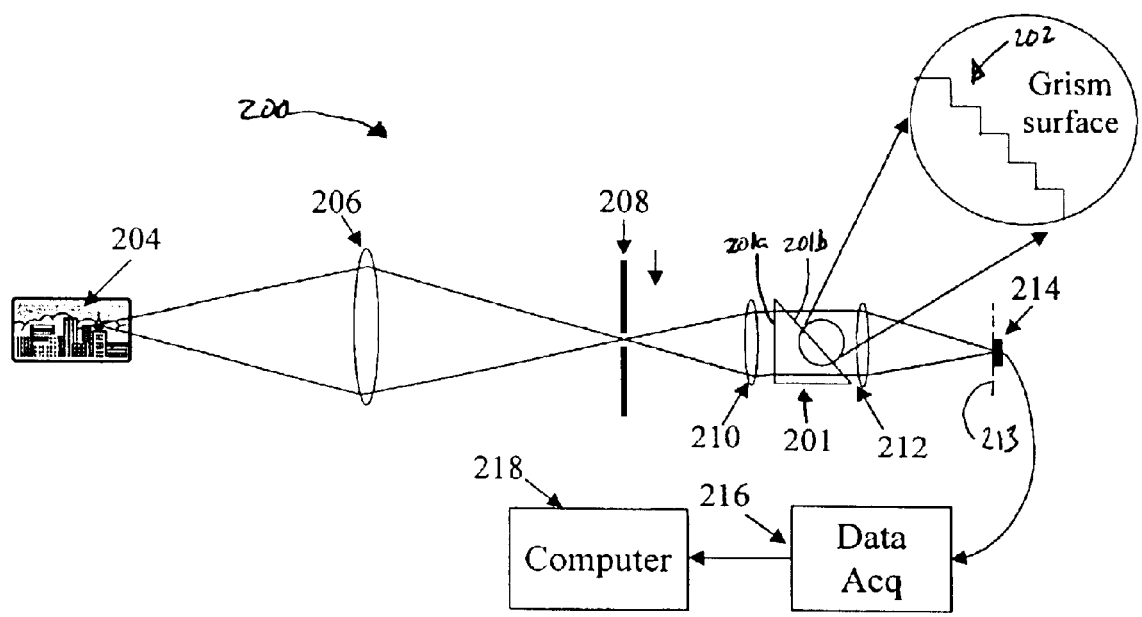
FIG. 4 is a schematic illustration of a dispersive spectrometer in accordance with an embodiment of the present invention.

FIG. 4 illustrates a first embodiment of a dispersive spectrometer 200 according to the present invention. Light from a scene 204 is collected by a primary lens 206 and focused onto a slit 208 so that light from a thin portion of the scene passes through the slit 208. Light from the thin portion of the scene then passes through a collimating lens 210 and is dispersed into constituent wavelengths by a grism 201. The grism 201 is a prism with a diffractive element 202 integral to either the entry surface 201a or the exit surface 201b of the grism 201. The prism aspect of the grism 201 may have a constant index of refraction or one that is a function of wavenumber. The grism 201 in FIG. 4 has the diffractive element 202 integral to the exit surface 201b, and is positioned so that light from the thin portion of the scene has an angle of incidence upon the diffractive element 202 that is greater than one-third of the critical angle at exit surface 201b. The light preferably has a normal angle of incidence with the entry surface 201a, however an off-normal angle of incidence may also be used. Dispersed light from the grism 201 is imaged by a focusing lens 212 onto a focal plane defined by the focusing lens. A focal plane array 214 is disposed at the focal plane 213 to detect dispersed light from the thin portion of the scene and provide a signal proportional to the detected light. The signal from the focal plane array 214 may thereafter be read out, digitized, and stored as data in a data acquisition system 216 for later access. A computer 218 may be advantageously employed to access, process, display, and/or utilize the data stored in the data acquisition system 216.

The spectral position of light on the focal plane array 214 for the dispersive spectrometer of FIG. 4 is a combination of compensating nonlinear functions of wavenumber, and is determined by the following equation:

$$\text{Deflection}(v) = a\sin\left(n(v) \cdot \sin(\beta) - \frac{1}{p \cdot v}\right) - \beta,$$

where $v$ is the wavenumber of the light, $\beta$ is the angle of incidence of the light on the grism, $p$ is the period of the grating on the exit side of the grism, and $n(v)$ is the refractive index of grism material. Those skilled in the art will recognize that based upon the above equation, dispersed light from the dispersive spectrometer of FIG. 4 is substantially linear in wavenumber for some ranges of wavenumbers when the other variable parameters are appropriately chosen.

For some applications, it may be desirable to shape the spectral dispersion using additional refractive optical elements. The additional refractive optical elements may be integral to the grism, as indicated above, or may be in the form of additional prisms, grisms, or any other type of refractive optical element. Such spectral shaping may be advantageous to emphasize one or more spectrums within a larger band such as the visible, NIR, SWIR, MWIR, LWIR, or FIR bands. For example, if the spectrum of interest includes the wavenumbers from 800 cm$^{-1}$ to 1000 cm$^{-1}$, then a refractive element may be introduced into the dispersive spectrometer to narrowly disperse light within the range of interest but broadly disperse light outside this range. Thus, when the light in the range of interest passes through the diffractive element of the grism, the spectral dispersion in this range may be over-sampled, while light outside the range is under-sampled. The refractive element may disperse light either in the same direction as the diffractive element or in a direction opposite the dispersion provided by the diffractive element.

The direction in which the refractive element disperses light depends on the application and the shape of the spectral dispersion desired. The refractive element may increase the dispersion caused by the diffractive element of the grism. In this case, the refractive element disperses light in the same direction as the diffractive element. Alternatively, the refractive element may decrease the dispersion caused by the diffractive element. In this case, the refractive element disperses light in a direction opposite the dispersion provided by the diffractive element.

Figure 5:
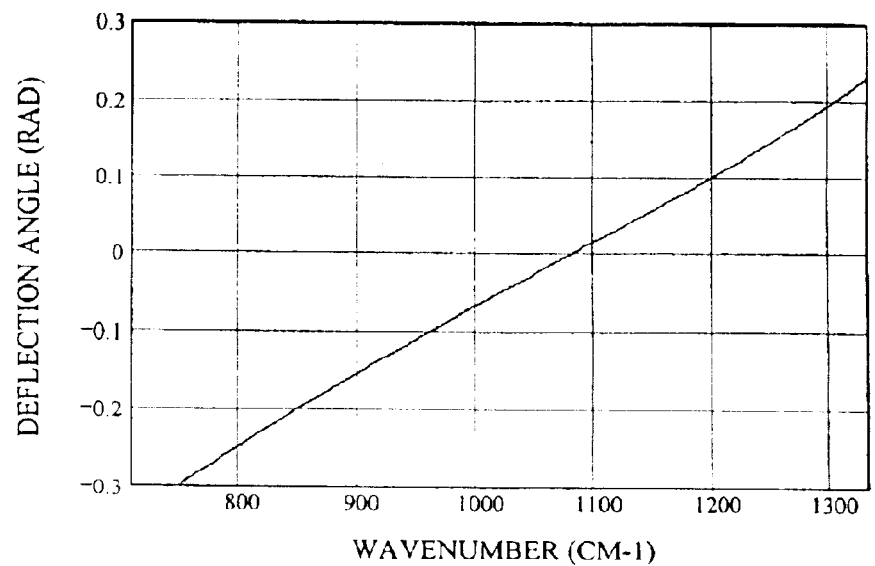
FIG. 5 is a plot representing the position of light on the focal plane versus spectral wavenumber for the dispersive spectrometer of FIG. 4.

FIG. 5 shows a plot of the spectral position of light from the thin portion of the scene on the focal plane array 214 as a function of wavenumber. The range of light shown is in the LWIR band. The deflection of the central color has been subtracted in FIG. 5 to provide a zero reference. The dispersive spectrometer used to obtain the plot of FIG. 5 included a grism made from a material with a refractive index of approximately 1.4, such as NaCl, and a grating period of 25.36 $\mu$m. With a refractive index of approximately 1.4, the critical angle is approximately 0.8 radians, and one-third of the critical angle is approximately 0.27 radians. The grism was positioned so that light from the thin portion of the scene had an angle of incidence of 1.15 radians with the diffractive element at the exit surface of the grism. Such a dispersive spectrometer shows one example of how to select the physical parameter value ranges in order to achieve a deflection that is substantially linear in wavenumber. Similar results may be achieved by using grisms made from other materials having high transmission rates for light in one or more of the visible or infrared bands, including materials such as ZnSe, KRS5, and CaF2.

Figure 6:
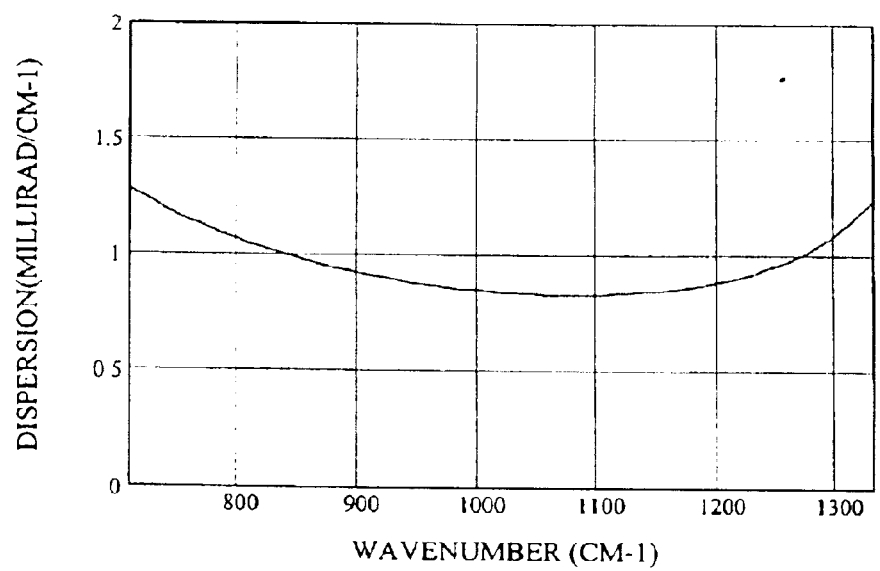
FIG. 6 is a plot representing dispersion versus wavenumber for the dispersive spectrometer of FIG. 4.

FIG. 6 is a plot representing the derivative of the plot of FIG. 5. This plot shows the spectral dispersion of light as a function of wavenumber for the dispersive spectrometer of FIG. 4. When compared to the spectral dispersion plotted in FIG. 3 for a dispersive spectrometer using a prism only, the spectral dispersion plotted in FIG. 6 for a dispersive spectrometer using a grism as described herein has relatively little variation across the band.

Figure 7:
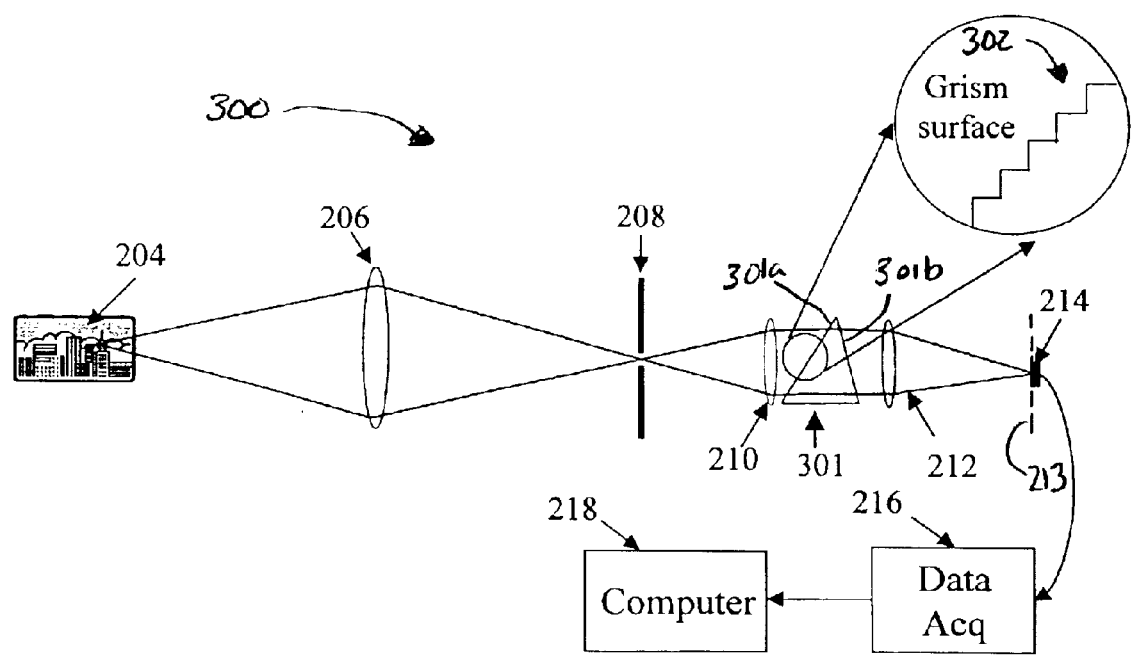
FIG. 7 is a schematic illustration of a dispersive spectrometer in accordance with another embodiment of the present invention.

FIG. 7 illustrates a second embodiment of a dispersive spectrometer 300 according to the present invention. In FIG. 7, the diffractive element 302 is integral to the entry surface 301a of the grism 301, and the grism 301 is disposed so that light from the thin portion of the scene has an angle of incidence upon the entry surface 301a that is greater than one-third of the critical angle at entry surface 301a. The light preferably has approximately a normal angle of incidence with the exit surface 301b, however an off-normal angle of incidence may also be used. The grism 301 may have a constant refractive index or a refractive index that is wavenumber dependent. When selecting the refractive index of the grism 301, the same considerations previously described may be utilized. The spectral position of light on the focal plane array 214 for the dispersive spectrometer of FIG. 7 is a combination of compensating nonlinear functions of wavenumber, and is determined by the following equation:

$$\text{Deflection}(v) = a\sin\left(n(v)\cdot\sin\left(a\sin\left(\frac{\sin(\beta)}{n(v)} + \frac{1}{n(v)\cdot v\cdot p}\right) - \alpha\right)\right),$$

where v is the wavenumber of the light, $\mu$ is the angle of incidence of the light on the grism, p is the period of the grating on the exit side of the grism, $\alpha$ is the wedge angle of the grism, and n(v) is the refractive index of grism material. Those skilled in the art will recognize that based upon the above equation, dispersed light from the dispersive spectrometer of FIG. 7 is substantially linear in wavenumber for some ranges of wavenumbers when the other variable parameters are appropriately chosen.

Figure 8:
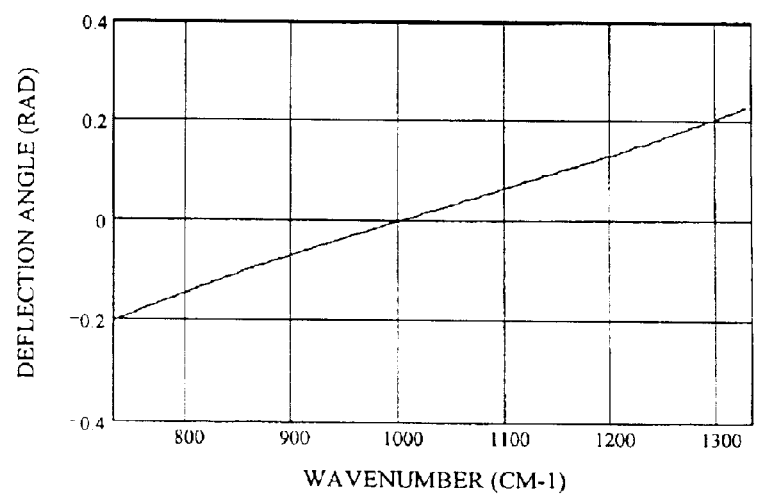
FIG. 8 is a plot representing the position of light on the focal plane versus spectral wavenumber for the dispersive spectrometer of FIG. 7.

FIG. 8 shows a plot of the spectral position of light from the thin portion of the scene on the focal plane array 214 as a function of wavenumber. The range of light shown is in the LWIR band. As before, the deflection of the central color has been subtracted in FIG. 8 to provide a zero reference. The dispersive spectrometer used to obtain the plot of FIG. 8 included a grism made from a material with a refractive index of approximately 2.4, such as KRS5. With a refractive index of approximately 2.4, the critical angle is approximately 0.43 radians, and one-third of the critical angle is approximately 0.14 radians. The grism also had a grating period of 36 $\mu$m, and a wedge angle of 0.594 radians. The grism was positioned so that light from the thin portion of the scene had an angle of incidence of 0.2 radians with the diffractive element at the exit surface of the grism. Such a dispersive spectrometer shows one example of how to select the physical parameter value ranges in order to achieve a deflection that is substantially linear in wavenumber. Similar results may be achieved by using a grism made from other materials having high transmission rates for light in one or more of the visible or infrared bands, including materials such as NaCl, ZnSe, and CaF2.

Figure 9:
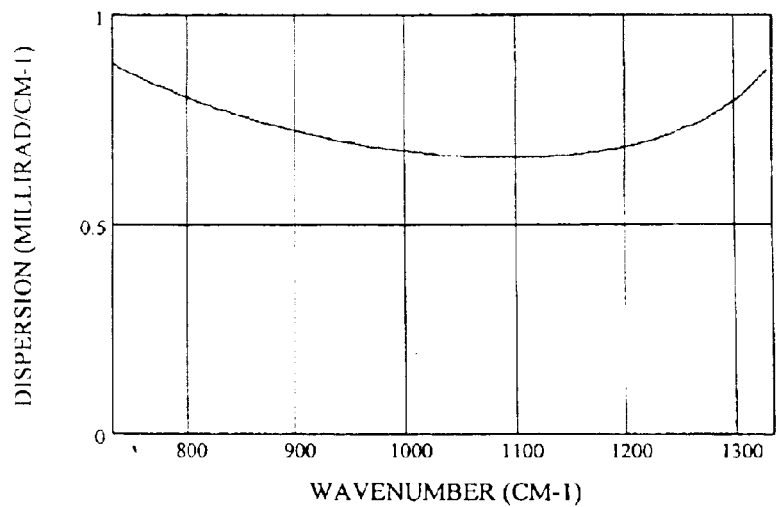
FIG. 9 is a plot representing dispersion versus wavenumber for the dispersive spectrometer of FIG. 7.

FIG. 9 is a plot representing the derivative of the plot of FIG. 8. This plot shows the spectral dispersion of light as a function of wavenumber for the dispersive spectrometer of FIG. 7. When compared to the spectral dispersion plotted in FIG. 3 for a dispersive spectrometer using a prism only, the spectral dispersion plotted in FIG. 9 for a dispersive spectrometer using a grism as described herein has relatively little variation across the band.

Figure 10:
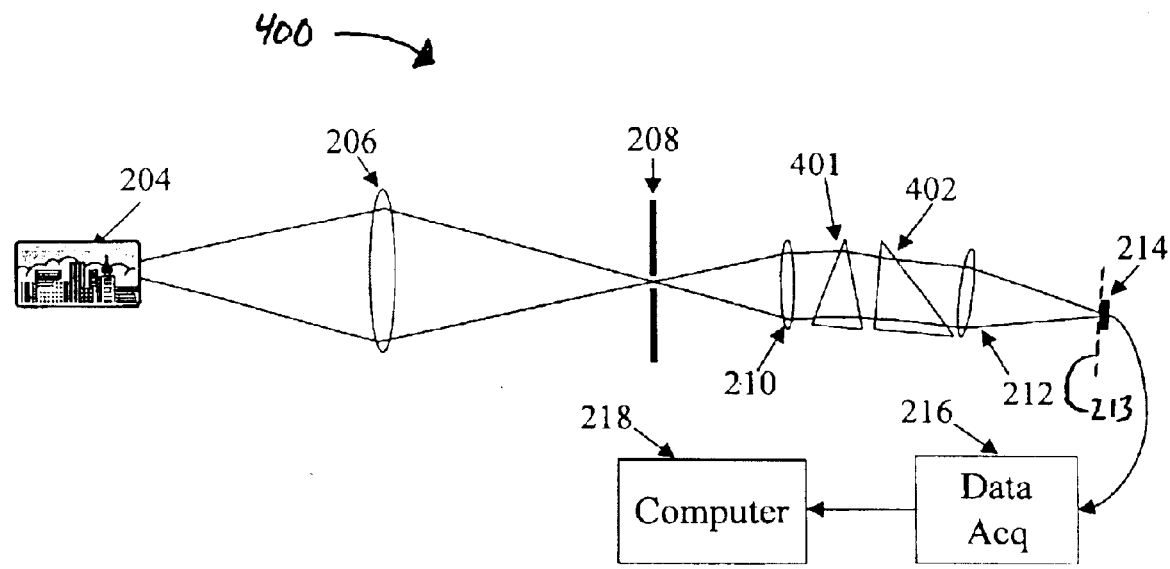
FIG. 10 is a schematic illustration of a dispersive spectrometer in accordance with another embodiment of the present invention.

FIG. 10 illustrates a third embodiment of a dispersive spectrometer 400 according to the present invention. In this embodiment, a prism 401 is optically disposed between the collimating lens 210 and the grism 402. The grism 402 in FIG. 10 has the diffractive element integral to the exit surface of the grism 402. However, the diffractive element may also be integral to the entry surface of the grism 402. The combination of the prism 401 and grism 402 may be used to shape the spectral dispersion on the focal plane array as desired. In shaping the spectral dispersion, the prism may be used so that it disperses light either in the same direction or in a direction opposite the dispersion provided by the grism. The prism 401 may thus be used to introduce non-uniform spectral dispersion, while the grism 402 is used to tailor the spectral dispersion output from the prism 401 into a desired form. The final form of the spectral dispersion may be substantially uniform or non-uniform as desired.

Figure 11:
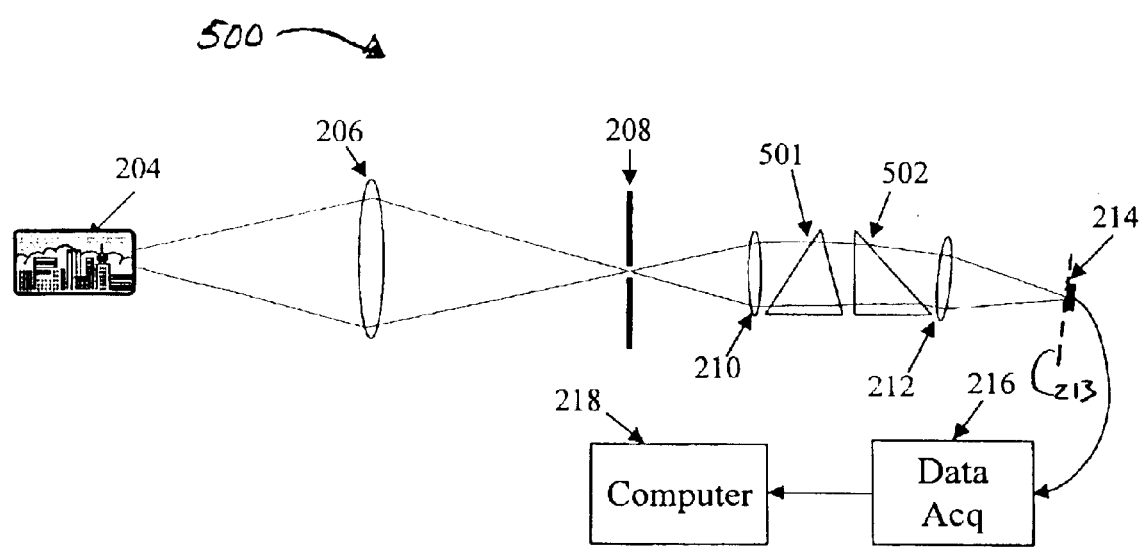
FIG. 11 is a schematic illustration of a dispersive spectrometer in accordance with another embodiment of the present invention.

FIG. 11 illustrates a fourth embodiment of a dispersive spectrometer 500 according to the present invention. This embodiment includes a first grism 501 and a second grism 502, and light from the thin portion of the scene passes through both. The combination of the two grisms may provide more uniform spectral dispersion than a single grism or more precise tailoring of a desired non-uniform spectral dispersion.

Thus, an improved dispersive spectrometer is disclosed. While embodiments of this invention have been shown and described, it would be apparent to those skilled in the art that many more modifications are possible without departing from the inventive concepts herein. Such modifications may include inserting additional refractive or reflective optical elements into the dispersive spectrometer to redirect, reduce, or magnify light from the scene. The invention, therefore, is not to be restricted except in the spirit of the following claims.

What is claimed is:

1. A dispersive spectrometer comprising:

a slit;

a primary lens to image a scene onto the slit, wherein light from a thin portion of the scene passes through the slit;

a collimating lens optically coupled to the slit to receive light from the thin portion of the scene;

a first grism optically coupled to the collimating lens to receive light from the thin portion of the scene, the first grism including a first diffractive element integral to a surface of the grism that disperses light from the thin portion of the scene in a first direction that is perpendicular to the major dimension of the thin portion of the scene, wherein light from the thin portion of the scene has an angle of incidence upon the first diffractive element that is greater than one-third of the critical angle at the surface of the grism; and a focusing lens optically coupled to the first grism to receive light from the thin portion of the scene, wherein the focusing lens defines a focal plane onto which light from the thin portion of the scene is imaged.

2. The dispersive spectrometer of claim 1, wherein the first grism is formed of a material having an index of refraction that varies over a range of wavenumbers.

3. The dispersive spectrometer of claim 2, wherein the index of refraction of the first grism disperses light from the thin portion of the scene in the first direction.

4. The dispersive spectrometer of claim 2, wherein the index of refraction of the first grism disperses light from the thin portion of the scene in a second direction opposite the first direction.

5. The dispersive spectrometer of claim 1, wherein light from the thin portion of the scene enters the first grism through an entry surface, the first diffractive element being integral to the entry surface, and exits the first grism through an exit surface, having approximately a normal incidence upon the exit surface.

6. The dispersive spectrometer of claim 1, wherein light from the thin portion of the scene enters the first grism through an entry surface, having approximately a normal incidence upon the entry surface, and exits the first grism through an exit surface, the first diffractive element being integral to the exit surface.

7. The dispersive spectrometer of claim 1 further comprising a focal plane array disposed at the focal plane to detect light from the thin portion of the scene.

8. The dispersive spectrometer of claim 1 further comprising a prism optically disposed between the collimating lens and the first grism, wherein the prism disperses light from the thin portion of the scene either in the first direction or in a second direction opposite the first direction.

9. The dispersive spectrometer of claim 1 further comprising a prism optically disposed between the focusing lens and the first grism, wherein the prism disperses light from the thin portion of the scene either in the first direction or in a second direction opposite the first direction.

10. The dispersive spectrometer of claim 1 further comprising a second grism optically disposed between the collimating lens and the first grism, the second grism including a second diffractive element, wherein the second diffractive element disperses light from the thin portion of the scene either in the first direction or in a second direction opposite the first direction.

11. A dispersive spectrometer comprising:

a slit;

a primary lens to image a scene onto the slit, wherein light from a thin portion of the scene passes through the slit;

a collimating lens optically coupled to the slit to receive light from the thin portion of the scene;

a grism optically coupled to the collimating lens to receive light from the thin portion of the scene, the grism including a diffractive element that disperses light from the thin portion of the scene in a first direction and a refractive element that disperses light from the thin portion of the scene in a second direction, wherein the first and second directions are perpendicular to the major dimension of the thin portion of the scene, and wherein light from the thin portion of the scene has an angle of incidence upon the diffractive element that is greater than one-third of the critical angle at the surface of the grism;

a focusing lens optically coupled to the first grism to receive light from the thin portion of the scene, wherein the focusing lens defines a focal plane onto which light from the thin portion of the scene is imaged; and a focal plane array disposed at the focal plane to detect light from the thin portion of the scene in a predetermined spectrum.

12. The dispersive spectrometer of claim 11, wherein the first direction is opposite the second direction.

13. The dispersive spectrometer of claim 11, wherein light from the thin portion of the scene enters the grism through an entry surface, the first diffractive element being integral to the entry surface, and exits the grism through an exit surface, having approximately a normal incidence upon the exit surface.

14. The dispersive spectrometer of claim 11, wherein light from the thin portion of the scene enters the grism through an entry surface, having approximately a normal incidence upon the entry surface, and exits the grism through an exit surface, the first diffractive element being integral to the exit surface.

* * * * *